United States Patent Office

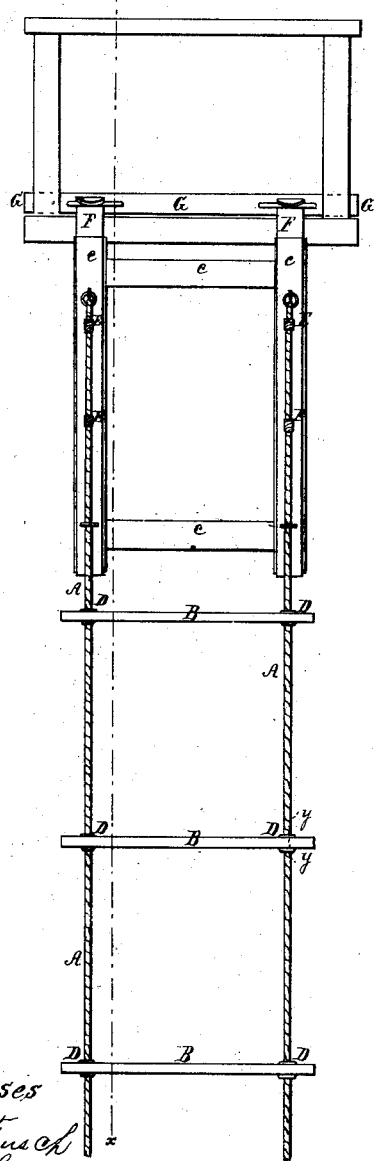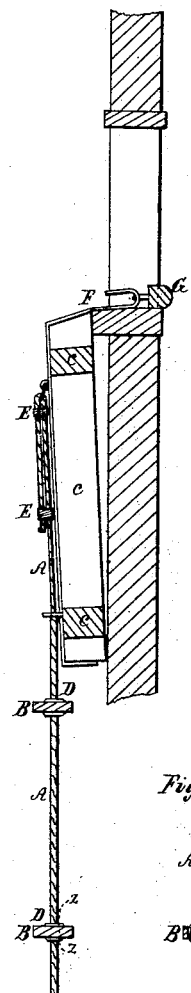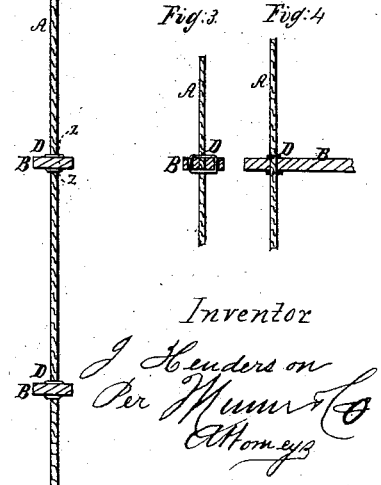

ISAAC HENDERSON, OF PHILADELPHIA, PENNSYLVANIA.

Letters Patent No. 62,418, dated February 26, 1867.

---

IMPROVED FIRE-ESCAPE LADDER.

---

The Schedule referred to in these Letters Patent and making part of the same.

---

TO ALL WHOM IT MAY CONCERN:

Be it known that I, ISAAC HENDERSON, of Philadelphia, in the county of Philadelphia, and State of Pennsylvania, have invented new and useful improvements in Fire-Escape Ladder; and I do hereby declare that the following is a full, clear, and exact description thereof, which will enable others skilled in the art to make and use the same, reference being had to the accompanying drawings, forming part of this specification, in which—

Figure 1 is a view of my improved fire escape, suspended from a window.

Figure 2 is a vertical section of the same, taken through the line $x\,x$, fig. 1.

Figure 3 is a detail sectional view of the same, taken through the line $y\,y$, fig. 1.

Figure 4 is a detail sectional view of the same, taken through the line $z\,z$, fig. 2.

Similar letters of reference indicate like parts.

My invention has for its object to furnish a simple means for escaping from the upper stories of buildings when the ordinary stair or passage ways are rendered impassable by fire or other circumstances, which shall be so constructed that it can be packed in a small space and thus kept always at hand, and which shall be so cheap as to be within the reach of all; and it consists in the peculiar manner in which the steps are attached to the side ropes, in the combination of a frame and hooks with the said ropes, and in the combination of a cross-bar with the hooks of the frame; the whole being constructed and arranged as hereinafter more fully described.

A are the side ropes of the ladder, to which the steps B are attached, and the upper ends of which are attached to the frame C. The steps B have holes through them near their ends for the passage of the side ropes A, as shown in the drawings. On each side of these main holes are formed smaller holes, through which are passed the small cords D, by which the steps B are secured to the side ropes A. The cords D are passed through these side holes in the steps B and between the strands of the side ropes A, both above and below the said steps, as shown in fig. 4. This manner of attachment secures the steps B firmly, and at the same time effectually prevents the said steps from turning beneath the feet of the person descending, thus making the descent easier and more free from danger than if constructed in the ordinary manner. The upper ends of the side ropes A are secured to the frame C by passing them through a ring, eye-bolt, or staple attached to the side bars of the said frame, near their lower ends, and through a ring or eye-bolt attached to the said bars near their upper ends. The ends of the ropes are then bent over upon themselves and secured in place by small cords E in the manner in which ropes are secured in a ship's rigging; or the ropes A may be secured to the frame C in any other convenient manner. The frame C is made of such a breadth that it will easily pass through a window, and to the upper ends of the side bars are attached hooks F, of such a length that when the frame is suspended from the window, as shown in the drawings, the said hooks should extend so far inward that they can be attached to the cross-bar G. The cross-bar G is of such a length that it will extend across the window frame so that its ends may rest against the side posts of said frame; and it has staples securely attached to it into which the hooks F hook; or, if desired, the bar G may be dispensed with, and the hooks F made of such a length and with their ends turned downward, so that they may hook over the inner side of the bottom of the window frame. But I prefer the manner first described as being the safer mode of attachment.

What I claim as new, and desire to secure by Letters Patent, is—

The cords D, passing through the side holes of the steps B, and between the strands of the rope A, above and below the steps, securing the steps to the ropes and preventing them from turning beneath the feet, substantially as described.

ISAAC HENDERSON.

Witnesses:
HENRY R. WISHART,
JOSEPH B. WILSON.